Feb. 4, 1958  E. W. J. FREY  2,822,212
CONTRACTIBLE HOME
Filed March 30, 1955  2 Sheets-Sheet 1
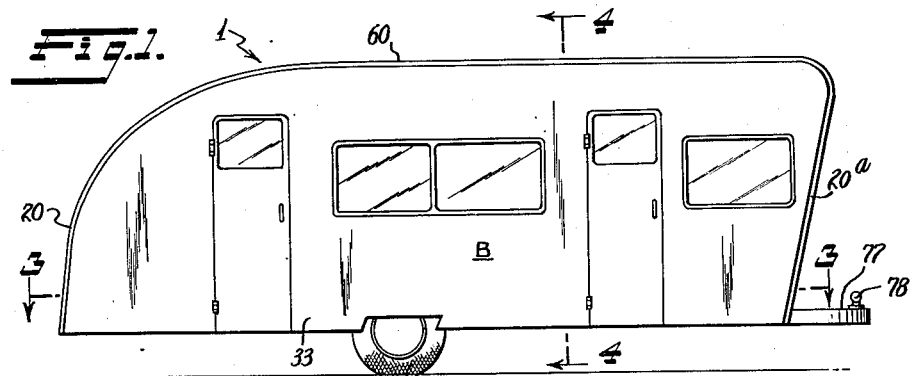
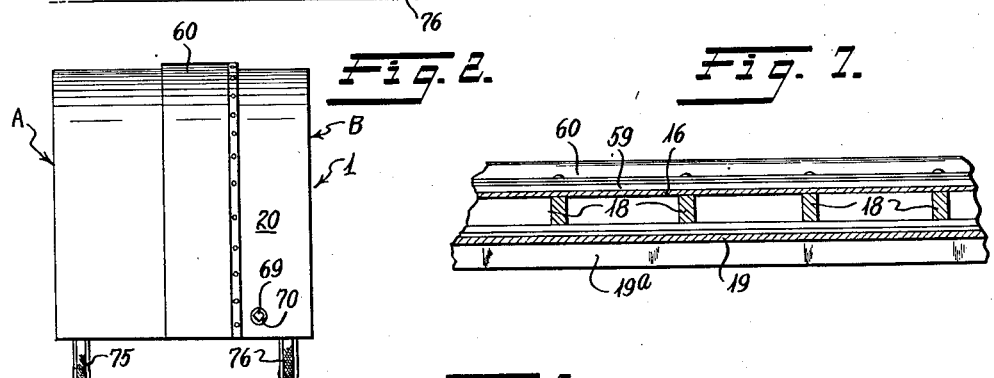
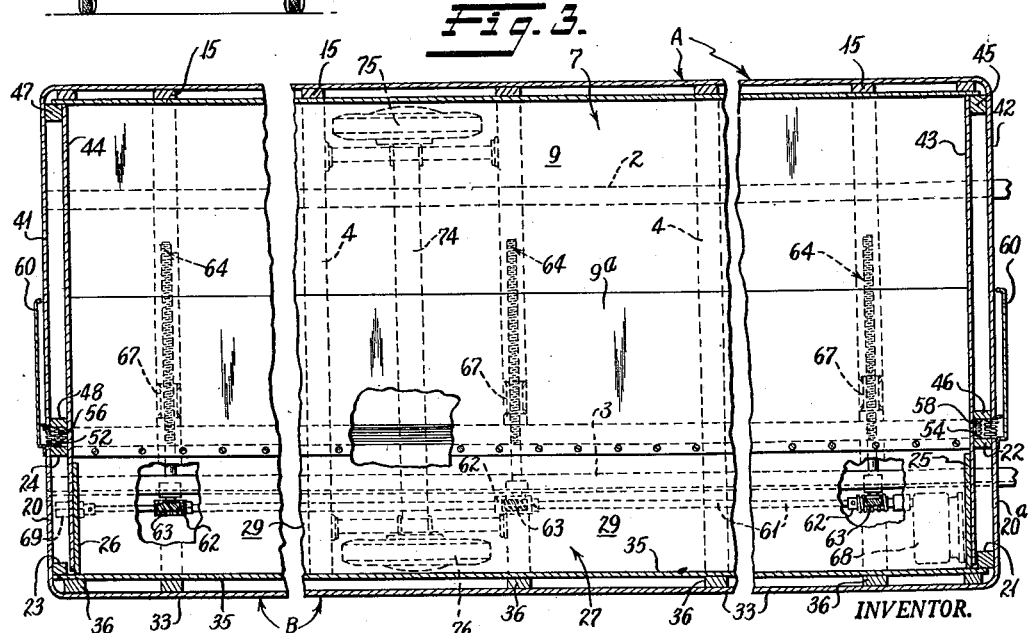
INVENTOR.
Elmer W. J. Frey
BY
Bacon & Thomas
ATTORNEYS Feb. 4, 1958 E. W. J. FREY 2,822,212
CONTRACTIBLE HOME
Filed March 30, 1955 2 Sheets-Sheet 2
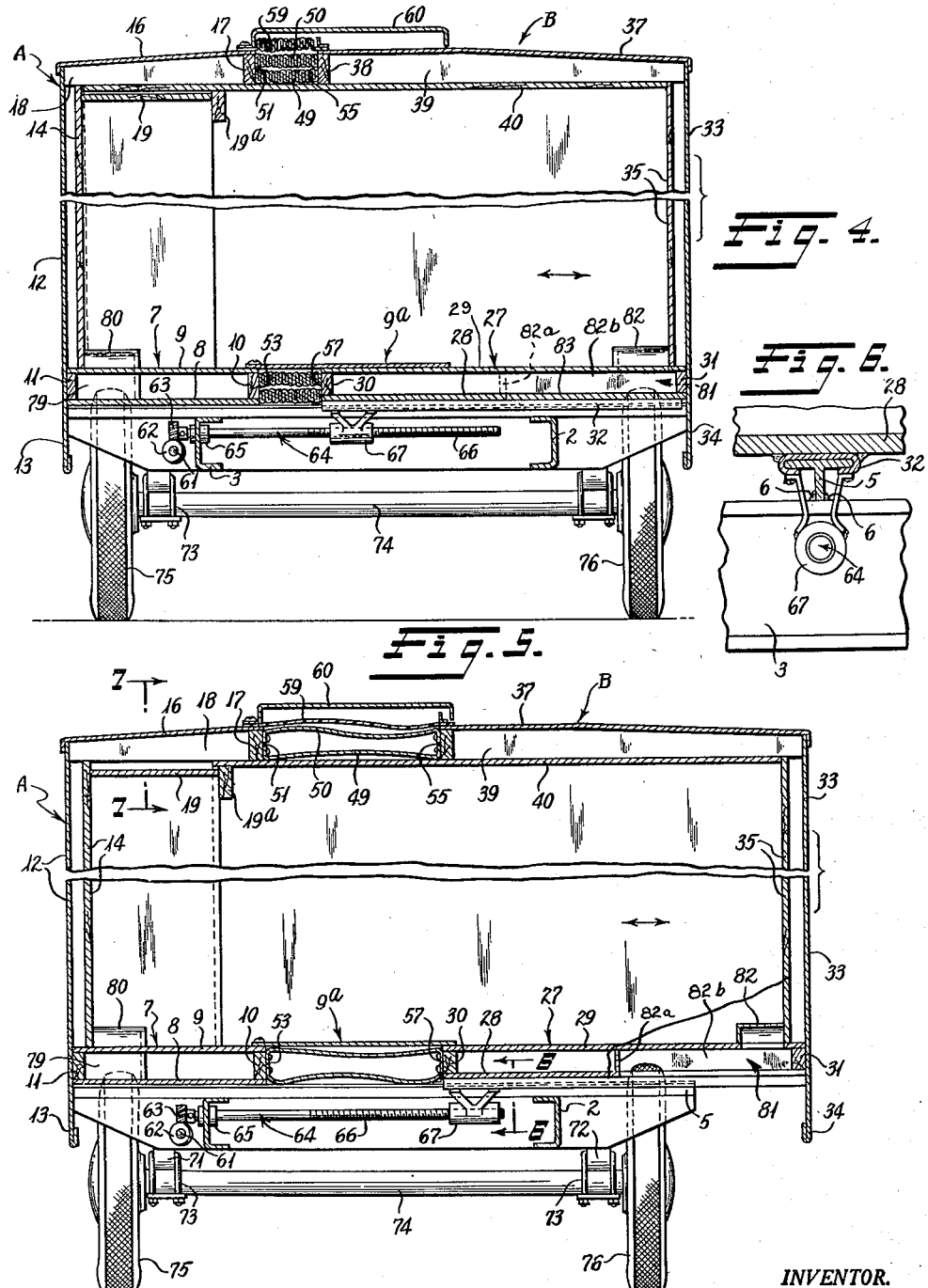
INVENTOR.
Elmer W. J. Frey
BY Bacon & Thomas
ATTORNEYS

United States Patent Office 2,822,212
Patented Feb. 4, 1958

2,822,212

CONTRACTIBLE HOME

Elmer W. J. Frey, Marshfield, Wis.

Application March 30, 1955, Serial No. 497,873

8 Claims. (Cl. 296—23)

My invention relates generally to mobile homes and the like, and more particularly to a type of mobile home which may be contracted in size. Although there is a basic difference between trailers, which are designed primarily for traveling, and mobile homes, which are designed primarily for living purposes, and although the vehicle described herein is of the latter class, it should be understood at the outset that many of the features employed here might be used in a trailer as well.

A primary object of the invention is to provide a mobile home which may be contracted to a relatively narrow width for travelling on the road and yet may resume its normal width when at rest to provide a larger, more comfortable living area.

Another object is to provide a construction for a contractible mobile home which requires only a minimum of effort to effect a contraction of its width or to make it resume its normal size.

Another object is to provide a contractible mobile home wherein the width-altering operations may be readily effected by the use of a small electric motor or by the use of a crank when an adequate source of electric power is not available.

Another object is to provide a contractible mobile home wherein the home is weather-sealed in all stages of contraction to provide adequate protection against rain, cold and other weather conditions.

A further object of this invention is to provide a contractible mobile home wherein the interior and exterior are neat and finished in appearance and attractive in design, whether in normal or contracted position.

A further object of this invention is to provide a contractible mobile home which is simple in construction, economical to manufacture and serviceable in use.

Other objects and features of the invention will be apparent from the following description taken in conjunction with the accompanying drawings in which:

Fig. 1 is a side elevational view of a mobile home embodying the invention;

Fig. 2 is a rear elevational view of the mobile home shown here in contracted position;

Fig. 3 is a fragmentary sectional view, on enlarged scale, taken along the line 3—3 of Fig. 1, having certain parts thereof broken away;

Fig. 4 is a fragmentary sectional view, on an enlarged scale, taken along the line 4—4 of Fig. 1, showing the invention in contracted position;

Fig. 5 is a view similar to Fig. 4, but having certain parts thereof broken away and showing the invention in normal position;

Fig. 6 is a fragmentary sectional view taken along the line 6—6 of Fig. 5; and

Fig. 7 is a fragmentary sectional view taken along the line 7—7 of Fig. 5.

Referring now in detail to the drawings, the mobile home generally indicated at 1 is mounted upon a rigid frame which comprises two longitudinal frame members 2 and 3 and a plurality of transverse frame members 4. Transverse T-shaped members 5 are positioned above the frame at points intermediate the transverse frame members 4 and may be secured to said frame by means of welding as shown at 6 in Fig. 6.

On one side of the vehicle, a stationary, relatively narrow, section A of the body is rigidly secured upon the transverse T-shaped members 5 by any suitable means such as welding, countersunk screws, or the like. Stationary section A includes members defining the ends, top, and bottom thereof and members defining a side wall. More specifically, stationary section A comprises a floor portion 7 including a subfloor 8 and a main floor 9. Subfloor 8 is mounted directly upon the transverse T-shaped members 5 by any suitable means. Main floor 9 is mounted over the subfloor 8 and is spaced therefrom by a longitudinal joist 10, positioned adjacent the inner edge of floor portion 7, and a longitudinal joist 11 positioned adjacent the outer edge thereof.

An outer side wall 12 is suitably attached to the floor portion, preferably to longitudinal joist member 11, and extends substantially therebelow to form an apron portion 13, which conceals the frame. An inner side wall 14 is spaced from the outer side wall 12 by means of the vertical studs 15 and abuts at its lower edge the upper surface of main floor 9. Provisions may be made in the inner and outer side walls 14 aand 12, respectively, for such windows and doors as may be desired.

A sloping roof 16 is mounted between the outer wall 12 and a longitudinal beam 17, and is supported by transverse tapered roof rafters 18. A ceiling 19 is mounted adjacent the upper edge of inner wall 14, said ceiling being spaced from the roof rafters 18, for a reason that will appear hereinafter, and being supported at its inner edge by longitudinal beam 19a.

The roof 16 is preferably curved downwardly at its back end to merge with a rear outer wall 20, and is also curved at its front end to merge with a front outer wall 20a. The front outer wall 20a is supported by generally vertical studs 21 and 22 (Fig. 3), and the rear outer wall 20 is supported by generally vertical studs 23 and 24. The ceiling 19 is similarly curved to merge with front and rear inner walls 25 and 26, respectively, each of which is spaced from the corresponding outer wall and secured in position by any suitable means. Front inner wall 25 is spaced from stud 21, and rear inner wall 26 is spaced from stud 23 for a reason which will appear hereinafter.

A relatively wide section B of the body is mounted on the opposite side of the frame from section A so as to be laterally slidable with respect thereto and also includes members defining the ends, top, and bottom thereof and members defining an outer side wall thereof. More specifically sections B comprises a floor portion 27, including a subfloor 28, having a plurality of transversely extending guide channels 32 suitably secured thereunder and positioned to slidingly receive the upper portion of the transverse T-shaped members 5, as shown in Fig. 6. A main floor 29 is mounted above subfloor 28, being spaced therefrom by longitudinal joists 30 and 31.

An outer side wall 33 is suitably attached to the floor portion 27, preferably to longitudinal joist member 31 and extends substantially therebelow to form an apron portion 34 which conceals the frame. An inner side wall 35 is spaced from the outer side wall 33 by means of the vertical studs 36 and abuts at its lower edge the upper surface of main floor 29. Provisions may be made in the inner and outer side walls for such windows or doors as may be desired.

A sloping roof 37 is mounted between the outer wall and a longitudinal beam 38 and is supported by transverse tapered roof rafters 39. A ceiling 40 is mounted at the upper edge of inner wall 35, and is secured to roof rafters 39 and longitudinal beam 38. The roof 37 is curved at its back end to merge with a rear outer wall 41, and is curved at its front end to merge with a front outer wall 42.

The ceiling is similarly curved to form front and rear inner walls 43 and 44, respectively. The front inner and outer walls are spaced and supported by generally vertical studs 45 and 46, and the rear inner and outer walls are spaced and supported by the generally vertical studs 47 and 48.

Ceiling 40 is of sufficient width to extend into the space between longitudinal beam 19a and roof rafters 18 and terminates adjacent the upper edge of inner wall 14 when the vehicle is in contracted position. The ceiling 40 is therefore of sufficient width to provide a finished interior appearance for the space between inner side wall 35 and longitudinal beam 19a whether the vehicle is in normal or contracted position.

Similarly the front inner wall 43 is of sufficient width to extend into the space between front inner wall 25 and vertical stud 21 and the rear inner wall 44 is of sufficient width to extend into the space between rear inner wall 26 and vertical stud 23, thereby providing a finished interior appearance to the walls in all stages of contraction.

A metal sheet 9a is secured along the inner edge of main floor 9, by any suitable means, said sheet being of sufficient width to cover the gap between floor 9 and floor 29 to afford a substantially uninterrupted floor portion which may be covered by a rug or by other suitable floor covering means.

Two strips 49 and 50 of an imperforate material are provided as a sealing means to effect a continuous weatherproof seal between section A and section B along the bottom, end walls and top of the vehicle. A flexible plastic sheet which will readily form a plurality of longitudinal folds has proved highly satisfactory for this purpose. One edge of strip 49 is attached to section A by nailing or any other suitable means along the lower edge of the face 51, of longitudinal beam 17, the inner edge of face 52 of vertical stud 24, the upper edge of face 53 of longitudinal joist 10 and the inner edge of the face 54 of vertical stud 22. The other edge of strip 49 is similarly attached to section B along the lower edge of face 55 of longitudinal beam 38, the inner edge of face 56 at vertical stud 48, the upper edge of face 57 of longitudinal joist 30 and the inner edge of face 58 of vertical stud 46.

The strip 50 is similarly attached to the same sets of opposed faces as is strip 49 and is spaced therefrom. One side of strip 50 is attached along the upper edge of face 51, the outer edge of face 52, the lower edge of face 53, and the outer edge of face 54 while the other side of strip 50 is attached along the upper edge of face 55, the outer edge of face 56, the lower edge of face 57 and the outer edge of face 58.

It will thus be seen that the gap between section A and section B is entirely enclosed by two strips of insulating material, which, because of their flexibility, substantially seal the vehicle both in its normal and in its contracted positions. The strips of material, as shown in Figs. 3 and 4, tend to assume accordion-like folds when the vehicle is contracted and to unfold as in Fig. 6 when the vehicle is returned to normal position.

Another strip 59 of weatherproof material may be provided to lend additional insulation and protection against direct contact with the elements. Strip 59 is suitably mounted between the opposed inner edges of outer walls 20 and 41, respectively, the opposed inner edges of roofs 16 and 37, respectively, and the opposed inner edges of outer walls 20a and 42, respectively, and is adapted to assume a folded condition similar to that of strips 49 and 50 when the vehicle is contracted.

A hoodlike guard 60 is secured to section A along the inner edges of the outer wall 20, roof 16, and outer wall 20a by screws or any other suitable means. The guard 60 is of sufficient width to completely cover the gap between sections A and B when the vehicle is in normal position. The guard 60 therefore affords a finished exterior appearance and additional protection whether the vehicle is in normal or contracted position.

In order to effect lateral movement of section B with respect to section A, there is provided a mechanism including a rotatable shaft 61 extending longitudinally of the vehicle and disposed under the section A. The shaft 61 may conveniently be journalled in the transverse frame members 4 and has a plurality of worms 62 fixed thereon at longitudinally spaced points.

Meshing with the worms 62 are pinions 63, attached by suitable means to the ends of transversely arranged screw members 64, which may be conveniently journalled adjacent their inner ends in bearings 65 in the longitudinal frame member 3. The screw members 64 have threaded portions 66 which extend outward to a considerable distance under the floor portion 27 of section B but terminate short of longitudinal frame member 2.

Threaded portions 66 are received by nut members 67 rigidly secured to guide channels 32.

The vehicle may therefore be contracted or returned to normal width by the rotation of shaft 61 in the appropriate direction, said rotation being in turn preferably effected by the use of a reversible electric motor 68 which may be used when suitable power is available, but when such power is not available, the rotation of shaft 61 may be effected by applying a crank to the squared end 69 of shaft 61 located opposite to the end which is attached to motor 68 and accessible through an aperture 70 in rear wall 20 of the vehicle.

Longitudinal leaf springs 71 and 72, mounted upon the frame in the usual manner, are secured by means of brackets 73 to an axle 74, said axle in turn carrying wheels 75 and 76.

Portions of the subfloor 8 and floor 9 are removed in order to provide clearance space 79 for wheel 75, covered by a housing 80. Similarly, portions of the subfloor 28 and floor 29 are removed in order to provide clearance space 81 for the wheel 76. Clearance space 81 is defined by housing means including an upper fender portion 82 situated over wheel 76 above the level of floor 29 adjacent wall 35. The lower portion of the housing means comprises an inner end wall 82a, laterally extending side walls 82b, and a portion 29a of floor 29, constituting the top of said lower portion. It will readily be seen that the housing means described have a lower portion of sufficient width to allow for lateral movement thereof with respect to wheel 76 without interference with subfloor 28 of any other structure of the movable section B, when the home is being contracted or being returned to normal position.

The longitudinal frame members 2 and 3 extend beyond the front of the vehicle and are bent inwardly and secured together at their front end to form a tow bar 77 having a conventional connecting member 78 mounted at the point of juncture for attachment to the towing vehicle.

It will thus be understood that the mobile home described above may be easily transported in its contracted position, being in this position no wider than the conventional mobile home, and that upon reaching its destination it may be readily made to assume its normal position, thereby providing a living area which is a great deal more comfortable than the cramped quarters of a conventional mobile home. It will be noted that the above-emphasized features of construction and design achieve the stated objectives.

It will be further understood that various changes and modifications may be made in the construction, design,

I claim:

1. A contractible mobile home, comprising: a portable frame; a home enclosure mounted on said frame and including two transversely spaced sections having top walls, front and rear end walls, and bottom walls positioned with the corresponding inner edges thereof in confronting transversely spaced relation, providing gaps therebetween, one of said sections being transversely slidable on said frame toward said other section to narrow said gaps and contract the size of said enclosure; and flexible sealing material mounted in and spanning said gaps with its opposite side edges secured to said confronting inner edges, said flexible sealing means being confined in said gaps when said one section is moved toward said other section.

2. A contractible mobile home or the like, as defined in claim 1 wherein the flexible sealing material comprises a continuous strip of flexible material.

3. A contractible mobile home or the like, as defined in claim 1 wherein the flexible sealing material comprises a plurality of spaced continuous strips of flexible imperforate material, each of said strips extending between the same members in superposed relation.

4. A contractible mobile home or the like, as defined in claim 1 wherein the flexible sealing material comprises an inner and an outer strip of flexible material.

5. A contractible mobile home or the like, as defined in claim 1 wherein the flexible sealing material includes a plurality of spaced continuous strips of flexible material, each of said strips extending between the corresponding members in superposed relation, and a similar strip secured between those of said members which define the tops and ends of said sections and outwardly of said inner and outer strips in overlying relation thereto.

6. A contractible mobile home or the like, as defined in claim 5 having a rigid guard attached to said stationary section and disposed over the entire width of said last-mentioned strip in all stages of contraction.

7. In a contractible mobile home or the like, a portable frame, a home enclosure mounted on said frame, said enclosure comprising a stationary section fixed to one side of said frame and having inner and outer spaced members defining the ends and top thereof and members defining the bottom and side wall thereof, a moveable section transversely slidable on said frame and having members defining the ends and top thereof and members defining the bottom and outer side wall thereof, the inner edges of said first-mentioned members of said moveable section being telescopically slidable in the space between the said spaced members of said stationary section to thereby define complete ends and top for said enclosure in all positions of lateral movement of said moveable section, a wheel mounted below said stationary section, wheel housing means provided in said stationary section above said wheel, a wheel mounted below said moveable section and wheel housing means provided in said moveable section, said housing means in said moveable section being provided with a lower portion of sufficient width to allow for the lateral movement of said housing means with respect to said wheel when said home is being contracted or being returned to normal width.

8. In a contractible mobile home, or the like, a portable frame, a home enclosure mounted on said frame, said enclosure comprising a stationary section fixed to one side of said frame and having inner and outer spaced members defining the top thereof and members defining the ends, bottom and side wall thereof, and a moveable section transversely slidable on said frame and having inner and outer spaced members defining the top thereof and members defining the ends, bottom and side wall thereof, said inner member on said top of said moveable section comprising an extended portion adapted to span the gap between said stationary and said moveable sections and be telescopically received within said inner and outer members of said top of said stationary section and said outer member of said stationary section comprising an extended portion adapted to overlie said top of said moveable section, whereby, in all stages of relative movement between said sections, protective covering means are positioned above and below the space between the tops of said sections.

References Cited in the file of this patent

UNITED STATES PATENTS

| | | |
|---|---|---|
| 1,964,894 | Rohne | July 3, 1934 |
| 2,150,615 | Sword | Mar. 14, 1939 |
| 2,177,394 | Pierce | Oct. 24, 1939 |
| 2,355,663 | McGlothlin | Aug. 15, 1944 |
| 2,506,870 | Hairston | May 9, 1950 |
| 2,606,057 | Johnson | Aug. 5, 1952 |
| 2,744,781 | Black | May 8, 1956 |